United States Patent
Abe et al.

(10) Patent No.: US 6,870,002 B2
(45) Date of Patent: Mar. 22, 2005

(54) RUBBER COMPOSITION

(75) Inventors: Katsumi Abe, Fujisawa (JP); Hironori Nishina, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/473,703

(22) PCT Filed: Dec. 16, 2002

(86) PCT No.: PCT/JP02/13121

§ 371 (c)(1),
(2), (4) Date: Sep. 29, 2003

(87) PCT Pub. No.: WO03/051983

PCT Pub. Date: Jun. 26, 2003

(65) Prior Publication Data

US 2004/0220316 A1 Nov. 4, 2004

(30) Foreign Application Priority Data

Dec. 14, 2001 (JP) ........................... 2001-381276

(51) Int. Cl.$^7$ .............................. C08L 25/10
(52) U.S. Cl. .................. 524/856; 526/310; 526/335
(58) Field of Search .................. 524/856; 526/310, 526/335

(56) References Cited

FOREIGN PATENT DOCUMENTS

| JP | 1-93103 | 4/1989 |
| JP | 6-287445 | * 10/1994 |

* cited by examiner

Primary Examiner—William K. Cheung
(74) Attorney, Agent, or Firm—Butzel Long

(57) ABSTRACT

A rubber composition, which comprises 100 parts by weight of a rubber mixture consisting of 70–95 wt. % of solid rubber and 30–5 wt. % of liquid rubber reactive on the solid rubber, and 450–1,000 parts by weight of magnetic powder. The rubber composition has an improved processability by adding liquid rubber reactive on solid rubber to the conventional magnetic powder-containing rubber, without any deterioration of physical properties proper to the rubber, while maintaining a high magnetic force proper to the magnetic powder, keeping the lower viscosity of rubber compound and holding distinguished heat resistance and flexibility of moldings.

8 Claims, No Drawings

RUBBER COMPOSITION

TECHNICAL FIELD

The present invention relates to a rubber composition, and more particularly to a rubber composition containing magnetic powder in addition to rubber components.

BACKGROUND ART

In magnetic encoders for use at encoder positions of wheel speed sensors, etc., rubber magnets designed specifically for the sensors have been so far used. Magnetic force as the most important characteristic of rubber magnets designed specifically for the sensors is substantially proportional to a mixing ratio of magnetic powder, and thus to increase the magnetic force, the mixing ratio of the magnetic powder must be increased, but too higher the mixing ratio of the magnetic powder gives rise to such problems as deterioration of processability due to an increase in the viscosity of rubber compound or an increase in the hardness of moldings and loss of flexibility as deemed to be an advantage of rubber magnet.

To solve these problems, it has been so far proposed to use a plasticizer or a processing aid, but use of a large amount of plasticizer or processing aid, which is necessary for assuring the flexibility, also gives rise to such problems as poor heat resistance due to extraction of the plasticizer or the processing aid and deterioration of bondability. Thus, these methods have been found not satisfactory from all aspects of processability, moldability and physical properties.

DISCLOSURE OF THE INVENTION

An object of the present invention is to provide a magnetic powder-containing rubber composition with improved processability, heat resistance and flexibility of moldings while maintaining a high magnetic force of the magnetic powder-containing rubber without any deterioration of physical properties proper to the rubber.

The object of the present invention can be attained by a rubber composition, which comprises 100 parts by weight of a rubber mixture consisting of 70–95 wt. % of solid rubber and 30–5 wt. % of liquid rubber reactive on the solid rubber, and 450–1,000 parts by weight of magnetic powder.

As the solid rubber, nitrile rubber (NBR), acrylic rubber (ACM), ethyl acrylate-ethylene copolymer rubber (AEM), ethylene-propylene copolymer rubber (EPDM), fluororubber (FKM), etc. can be used, dependent upon the desired application. From the viewpoint of cost, NBR, ACM, AEM and EPDM are preferable, and from the viewpoint of easiness to attain a higher filing ratio of the magnetic powder NBR is more preferable.

For the balance between the oil resistance and low temperature characteristics, a solid NBR with a nitrile content of preferably 35–45%, more preferably 36–42%, is used. In other words, commercially available solid NBR can be used as such. Below the lower limit of nitrile content the oil resistance will be deteriorated, whereas above the upper limit of nitrile content the low temperature characteristics will be deteriorated.

The liquid rubber reactive on the solid rubber is a liquid rubber having the same structure as or similar structure to that of the solid rubber and being cocross-linkable with the same vulcanizing agent as for the solid rubber, and liquid NBR, liquid EPDM, liquid FKM, etc. can be used, dependent upon selected solid rubber. Liquid rubber with a B-type viscosity (70° C.) of preferably 4,000–20,000 cps, more preferably 4,500–15,000 cps, is used.

Liquid NBR for use in NBR as the solid rubber has preferably a B-type viscosity (70° C.) of 4,000–8,000 cps and a nitrile content of 26–32%, more preferably a B-type viscosity (70° C.) of 4,500–7,000 cps and a nitrile content of 28–30%, and commercially available liquid NBR can be used as such. Below the lower limit of B-type viscosity, the strength of the vulcanization products will be lowered, whereas above the upper limit of B-type viscosity the plasticity will be lost. Below the lower limit of nitrile content the oil resistance will be deteriorated, whereas above the upper limit of nitrile content the low temperature characteristics will be deteriorated.

The solid rubber and the liquid rubber reactive on the solid rubber are used in a proportion of 70–95 wt. % of the solid rubber to 30–5 wt. % of the liquid rubber reactive on the solid rubber, preferably 80–93 wt. % of the solid rubber to 20–7 wt. % of the liquid rubber reactive on the solid rubber. Below 5 wt. % of the liquid rubber, the effect of addition of the liquid rubber reactive on the solid rubber will be lowered, whereas above 30 wt. % the viscosity of the rubber compound will be much lowered, resulting in deterioration of the processability.

As the magnetic powder, at least one of ferrite magnets and rare earth magnets is used usually, but preferably from the viewpoints of lower cost and higher bondability to the rubber, ferrite magnets is used, though the magnetic force is lower than those of rare earth magnets, and more preferably from the viewpoint of the magnetic force strontium ferrite $SrO.6Fe_2O_3$ and barium ferrite $BaO.6Fe_2O_3$ are used.

The magnetic powder is formed into test samples by adding 1.5 ml of an aqueous 5 wt. % PVA solution to 20 g of the magnetic powder and placing the mixture in a cylindrical mold, 25.4 mm in diameter, followed by pressing under pressure of 1 ton/cm$^2$. The resulting test samples are then subjected to determination of green magnetism, that is remnant flux density Br and coercive force iHc, by a direct-current magnetizing tester. It is preferable to use a magnetic powder with a Br value of 1,600 (G) or more and an iHc value of 3,000 (Oe) or more.

The magnetic powder is used in a proportion of 450–1,000 parts by weight, preferably 600–900 parts by weight to 100 parts by weight of the rubber mixture. Below the lower limit proportion the magnetic force, when used for encoders, will not be satisfactory, whereas above the upper limit proportion the flexibility of moldings will be considerably deteriorated.

A reinforcing agent, an antioxidant, a plasticizer, a processing aid, a cross-linking agent, a cross-linking aid, etc. can be added to the foregoing rubber composition, if necessary, and vulcanization can be carried out by the ordinary method so far used for rubber.

An adhesive for use in bonding of the vulcanization moldings of the present rubber composition to encoder metal rings includes, for example, commercially available phenol resin, epoxy resin, etc. and stainless steel, cold rolled steel sheets, etc. are used as the metal.

BEST MODES FOR CARRYING OUT THE INVENTION

The present invention will be described in detail below, referring to Examples, which should not be interpreted to be restrictive of the present invention.

EXAMPLES 1 to 3 AND COMPARATIVE EXAMPLES 1 to 3

|  | Example No. | | | Com. Ex. No. | | |
|---|---|---|---|---|---|---|
|  | 1 | 2 | 3 | 1 | 2 | 3 |
| Solid NBR (N220S, product of Japan Synthetic Rubber Co. Ltd: Nitrile content: 41%) | 90 | 80 | 70 | 100 | 100 | 100 |
| Liquid NBR (Nipol 1312, product of Nihon Zeon Corporation. Nitrile content: 28%, B-type viscosity (70° C.): 6,000 cps) | 10 | 20 | 30 | 0 | 0 | 0 |
| Sr ferrite (FM-201, product of Toda Kyogo K.K.) | 800 | 800 | 800 | 450 | 800 | 800 |
| Activated zinc oxide powder | 3 | 3 | 3 | 3 | 3 | 3 |
| Antioxidant (4,4'-bis(α,α-dimethylbenzyl)diphenyl amine; Nocrac CD, product of Ouchi-Shinko Kagaku K.K.) | 2 | 2 | 2 | 2 | 2 | 2 |
| Processing aid(stearic acid) | 2 | 2 | 2 | 2 | 2 | 2 |
| Polyether-based plasticizer (RS700, product of Asahi Denka Kogyo K.K.) | 5 | 5 | 5 | 5 | 5 | 20 |
| Sulfur | 0.8 | 0.8 | 0.8 | 0.8 | 0.8 | 0.8 |
| Cross-lingking aid (tetramethylthiuram disulfide; Nocceler TT, product of Ouchi-Shinko Kagaku K.K.) | 2 | 2 | 2 | 2 | 2 | 2 |
| Cross-linking aid (N-cyclohexyl-2-benzothiazyl sulfenamide; Nocceler CZ, product of Ouchi-Shinko Kagaku K.K.) | 1 | 1 | 1 | 1 | 1 | 1 |

The foregoing components were kneaded in a internal mixer and through open rolls, followed by compression molding at 170° C. for 15 minute to prepare 2 mm-thick test samples.

The test samples were subjected to tests according to the following test items:

Normal state physical properties: according to JIS K6251 and JIS K6253

Mooney viscosity Vm: according to the definition in JIS K6200 terms

Cracking at molding: sheets, 120 mm×240 mm×2 mm were molded and cracking at mold releasing was observed Bondability test: according to 90° peeling method described in JIS K6256, paragraph 5

Magnetic force: minimum value at the center of 2 mm-thick, 29 mm diameter samples (2 kV-1200 μF magnetization) by a handy gauss meter Heat resistance: hardness changes after heating at 120° C. for 70 hours (tests with a JIS No. 4 dumb-bell-punched test pieces)

Shrinkage: shrinkage in the longitudinal direction of test pieces, 5 mm×100 mm, after heating at 175° C. for 70 hours Results of measurements of test samples obtained in the foregoing Examples and Comparative Examples are given in the following Table together with results of measurement of Mooney viscosity (125° C.) of kneading products.

TABLE

|  | Example No. | | | Com. Ex. No. | | |
|---|---|---|---|---|---|---|
| Measurement Item | 1 | 2 | 3 | 1 | 2 | 3 |
| Normal state physical properties |  |  |  |  |  |  |
| Hardness (Duro A) | 87 | 81 | 78 | 86 | 94 | 80 |
| Tensile strength (Mpa) | 2.4 | 1.7 | 1.1 | 4.5 | 2.7 | 0.8 |
| Elongation (%) | 350 | 570 | 780 | 260 | 370 | 620 |
| Mooney viscosity Vm | 58 | 34 | 18 | 60 | 100> | 32 |
| Cracking at molding (number of cracked samples/number of total samples) | 0/10 | 0/10 | 0/10 | 0/10 | 8/10 | 0/10 |
| Bondability test |  |  |  |  |  |  |
| Rubber retention (%) | 100 | 100 | 100 | 100 | 100 | 60 |
| Magnetic force (G) | 108 | 107 | 107 | 88 | 105 | 101 |
| Heat resistance |  |  |  |  |  |  |
| Hardness changes (points) | +4 | +7 | +7 | +6 | +2 | +10 |
| Shrinkage (%) | 2.9 | 3.5 | 4.0 | 9.0 | 3.1 | 8.3 |

INDUSTRIAL UTILITY

By adding liquid rubber reactive on solid rubber to the conventional magnetic powder-contained rubber, processability can be improved without any deterioration of physical properties proper to the rubber, while maintaining a high magnetic force proper to the magnetic powder, keeping the lower viscosity of rubber compound and holding distinguished heat resistance and flexibility of moldings. The present rubber compositions can be suitably used as rubber magnets designed specifically for sensors in magnetic encoders used at the encoder positions such as wheel speed sensors, etc.

What is claimed is:

1. A rubber composition, which comprises 100 parts by weight of a rubber mixture consisting of 70–94 wt. % of solid rubber and 30–5 wt. % of liquid rubber reactive on the solid rubber, and 450–1,000 parts by weight of magnetic powder.

2. A rubber composition according to claim 1, wherein the liquid rubber reactive on the solid rubber is a liquid rubber cocross-linkable by a same cross-linking agent as for the solid rubber.

3. A rubber composition according to claim 1, wherein the solid rubber is solid NBR and the liquid rubber is liquid NBR.

4. A rubber composition according to claim 3, wherein the solid NBR has a nitrile content of 35–45 %.

5. A rubber composition according to claim 1, wherein the liquid rubber has a B type viscosity (70° C.) of 4,000–20,000 cps.

6. A rubber composition according to claim 3, wherein the liquid NBR has a B type viscosity (70° C.) of 4,000–8,000 cps and nitrile content of 26–32 %.

7. A rubber composition according to claim 1, wherein the magnetic powder is at least one of ferrite magnetic powder and rear earth magnetic powder.

8. A rubber composition according to claim 7, wherein the ferrite magnetic powder comprises strontium ferrite or barium ferrite.

\* \* \* \* \*